UNITED STATES PATENT OFFICE.

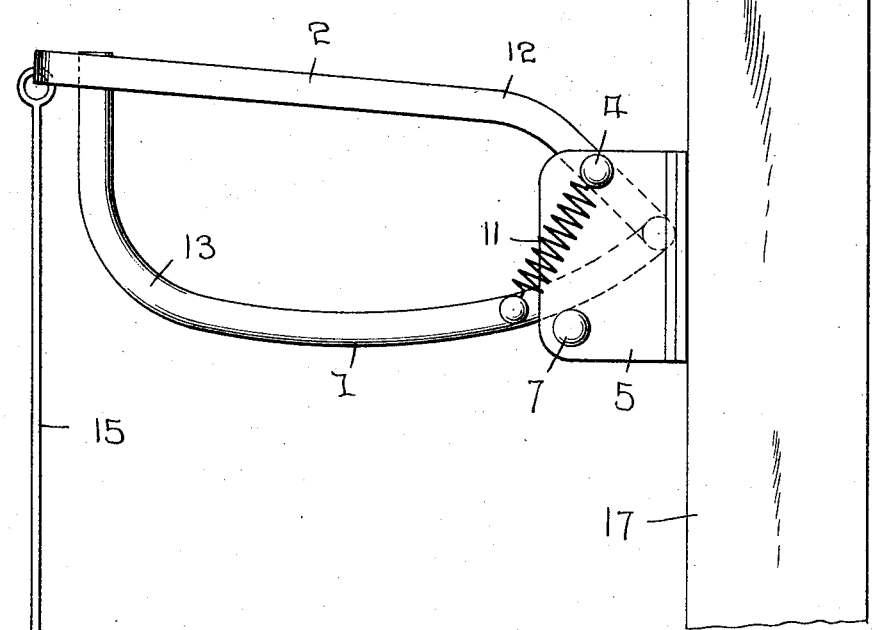
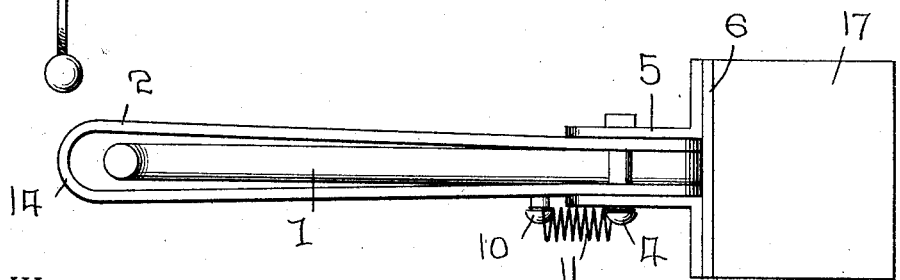

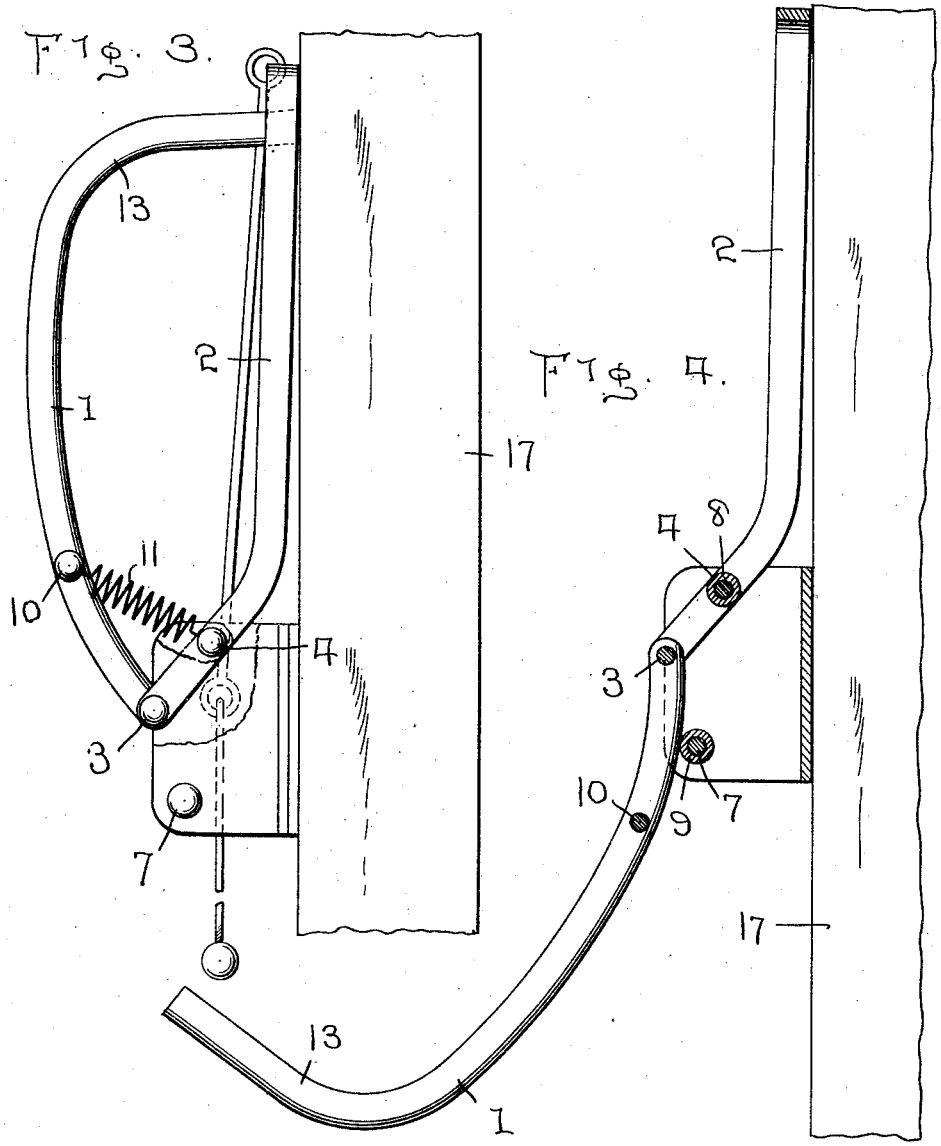

JOHN HOWARD, OF ALBION, NEBRASKA.

HARNESS-SUPPORTING HOOK.

1,005,219. Specification of Letters Patent. Patented Oct. 10, 1911.

Application filed April 28, 1911. Serial No. 623,832.

*To all whom it may concern:*

Be it known that I, JOHN HOWARD, a citizen of the United States, residing at Albion, in the county of Boone and State of Nebraska, have invented certain new and useful Improvements in Harness-Supporting Hooks; and I do hereby declare the following to be a full, clear, and exact description of the invention, such as will enable others skilled in the art to which it appertains to make and use the same.

This invention relates to supporting hooks and more particularly to hooks for supporting harness.

An object of the invention is to provide harness supporting hooks, which may be secured on a flat wall or on the face of a post.

Another object is to provide harness supporting hooks, which will support the harness in a convenient place and which may, when the harness is removed therefrom, be swung upwardly against the post or wall to which the device is attached where it will be out of the way.

Another object is to provide supporting hooks so connected and of such form that they may be operated by a boy standing on the ground or floor, and, Another object is to provide hooks of the above stated nature which will effectively support the harness without any danger of the jaws of the hook becoming separated and allowing the harness to fall or be knocked from the supporting hooks.

Other objects and advantages will be hereinafter set forth and pointed out in the specification and claims.

In the accompanying drawings which are made a part of this application, Figure 1 is a side elevational view of the device upon a post, showing the hooks in the position they assume while the harness is positioned therebetween and suspended from the lower jaw, the upper and lower ends of the post being broken away. Fig. 2 is a top plan view of Fig. 1. Fig. 3 is a view similar to Fig. 1, showing the hooks swung upwardly against the post after the harness has been removed therefrom, and, Fig. 4 is a similar view, showing the hooks swung to open position to receive the harness thereon.

Referring to the drawings in which similar reference numerals designate corresponding parts throughout the several views, 1 is the lower jaw, which receives the harness thereon and 2 the upper jaw, the two jaws being pivoted at their inner ends by means of the pivot pin or bolt 3.

The lower jaw 1 is preferably circular in cross section, while the upper jaw 2 is U-shaped, the purpose of which will later appear. The upper jaw 2 is provided with the pivot pin 4, which extends through the opposite jaws 5 of the bracket 6, which latter is secured to the wall or post in any preferred manner. The pivot pin 4 is positioned near the upper outer corners of the opposite jaws 5, while the stop pin 7 is secured through said jaws near the lower outer corners thereof. This stop pin 7 limits the downward movement of the lower jaw 1, the latter abutting thereagainst. If desired, the pins 4 and 7 may be provided with rollers 8 and 9, repsectively, to facilitate the easy swinging operation of the jaws 1 and 2.

Rigidly connected to the lower jaw 1 adjacent the plates 5 and extending from one side of said jaw, is the pin 10, which has secured thereto one end of the tension spring 11, while the opposite end of said spring is connected to the projecting end of the pin or rivet 4. This tension spring 11 tends to normally hold the jaws resiliently engaged.

As will be seen, the U-shaped jaw 2 extends horizontally from its bending point 12, while the portion between the bending point 12 and the connecting pin 3 extends downwardly at an angle of about 45 degrees when the supporting hooks are in their downward position. The jaw 1 is curved slightly from the pivot pin 3 to its turning point 13, at which point it is bent in an upward direction, the upper extremity thereof resting between the opposite parallel sides of the U-shaped member 2, a short distance inwardly of the bight portion 14 of said U-shaped jaw.

Secured in the outer or bight portion 14 of the upper jaw, is the upper end of the operating rod 15, which has secured in its lower end a suitable rope or cord 16 extending to within a short distance of the ground or floor.

When it is desired to place harness or other articles upon the supporting hooks, the rod 15 is shoved upwardly to raise the upper jaw 2, the lower jaw 1 being forced downwardly by means of the pivot pins 3 and 4, as shown in Fig. 4. If the spring 11 tends to draw the jaw 1 upwardly with the jaw 2, the lower jaw may be grasped to prevent upward movement thereof. When the harness or other articles have been placed upon the lower jaw, the rod 15 is pulled downwardly, drawing the upper jaw 2 to its horizontal position and forcing the jaw 1 upwardly to its normal position, as shown in Fig. 1. When it is desired to remove the articles from the hooks, the operation for separating the jaws is repeated, as described in the first part of this paragraph. When it is desired to swing the supporting hooks upwardly against the post or wall 17 by which they are supported, the rod 15 is shoved upwardly, as previously described, the rod 15 and the spring 11 drawing the lower jaw 1 upwardly in the same relative position as when the hooks are in their horizontal positions. This position is clearly illustrated in Fig. 3 of the drawings. There is no danger of the hooks dropping down from this position and thereby causing damage for the reason that they are swung beyond the dead center and will rest in this position until drawn downwardly by a pull being exerted upon the rod 15 or the rope or chain 16 connected thereto. For the reason that the rod 15 has a cord or rope 16 connected to its middle end and depending therefrom, the device may be operated by a boy or short person while standing upon the ground or floor below the hooks.

Thus it will be seen that I have provided supporting hooks which are of simple construction and operation and which will effectively serve to support harness or other articles and which may be swung out of position when not in use.

What I claim is:

1. Supporting hooks comprising upper and lower jaws pivotally connected at their inner ends, means for limiting the downward movement of said jaws, a bracket for supporting said jaws, said bracket to be secured to a stationary support, said bracket and said stationary support adapted to coact to limit the upward movement of said jaws, means for separating said jaws, said separating means to be also used to swing said jaws to their uppermost position and to draw them to their lowermost position, and means for resiliently holding said jaws in their normal position in relation to one another.

2. Supporting hooks comprising an upper jaw, a lower jaw pivotally connected to the inner end of said upper jaw, a bracket to support said jaws, said bracket being adapted to be secured upon a vertical support, said upper jaw being pivoted to said bracket near the inner end of said jaw, a stop carried by said bracket to limit the downward movement of said lower jaw, means for drawing and holding said jaws in proper relation with one another, and means for separating said jaws and for swinging said supporting hooks into inoperative position.

3. Supporting hooks comprising an upper horizontal jaw having its inner end directed downwardly to the main portion, said downwardly directed portion being pivoted to a pivot pin, said pivot pin being secured to a bracket carried upon a stationary support, a lower curved jaw having its inner end secured to said inner end of said upper jaw, said upper jaw curved downwardly and having its outer end curved upwardly from the downwardly curved portion, said upwardly curved end of said lower jaw adapted to interlock with said horizontal upper jaw when the hooks are in closed position, means for separating said jaws and drawing said jaws together, a spring connected with each of said jaws near their inner ends to resiliently hold said jaws in closed position, said jaws adapted to support articles thereon and therebetween, means for limiting the downward movement of said lower jaw, said jaws being adapted to be swung into vertical position against the stationary support to which said bracket is secured, and means for returning said jaws.

4. Harness supporting means comprising coöperating jaws, said jaws being connected at their inner ends and meeting near their outer free ends, a bracket for supporting said jaws, said bracket having opposite parallel ears, a pivot pin positioned through said ears, one of said jaws being mounted on said pivot pin between said ears, a stop pin positioned through said ears to limit the downward movement of one of said jaws, means for holding said jaws in proper relation to one another, means for opening and closing said jaws, said jaws adapted to be swung into inoperative position, and means for returning said jaws to operative position.

5. Harness supporting means comprising coöperating jaws, said jaws being connected at their inner ends and meeting near their outer free ends, a bracket for supporting said jaws, said bracket having opposite parallel ears, a pivot pin positioned through said ears, one of said jaws being mounted on said pivot pin between said ears, a stop pin positioned through said ears, to limit the downward movement of one of said jaws, means for holding said jaws in proper relation to one another, means for opening and closing said jaws, said jaws adapted to be swung into inoperative position, means for returning said jaws to operative position, a projection carried by the downwardly movable jaw, said jaw holding means having one of its ends secured to said projection while its opposite end is secured to said pivot pin, and means for reducing to a minimum the friction caused by the operation of the movable parts.

In testimony whereof I have signed my name to this specification in the presence of two subscribing witnesses.

JOHN HOWARD.

Witnesses:
A. R. CARSTEN,
JAMES FOX.

Copies of this patent may be obtained for five cents each, by addressing the "Commissioner of Patents, Washington, D. C."